2 Sheets—Sheet 1.

T. M. DAVIS.
INCUBATOR.

No. 193,490. Patented July 24, 1877.

Witnesses
Henry Howson Jr
Harry Smith

Thomas M. Davis
by his Attorneys
Howson and Son

N. PETERS, PHOTO-LITHOGRAPHER, WASHINGTON, D. C.

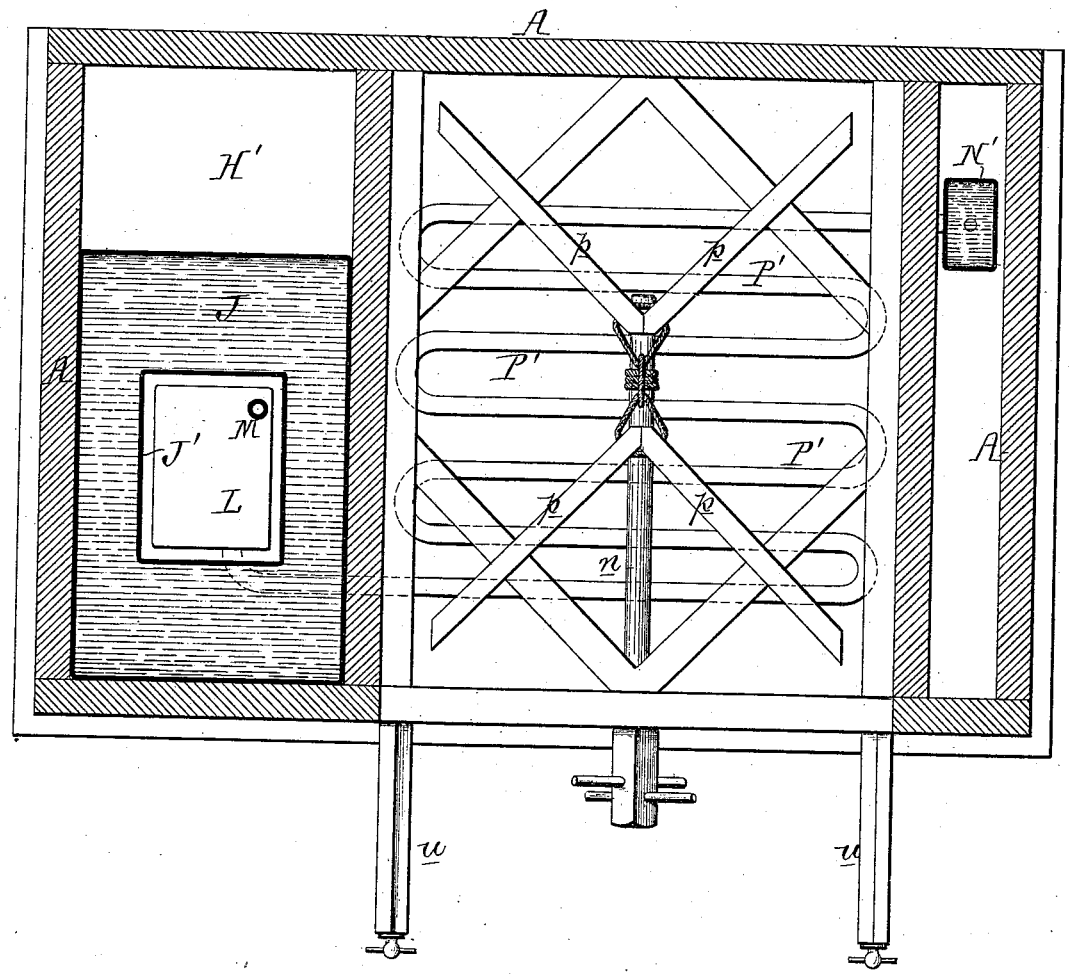

UNITED STATES PATENT OFFICE.

THOMAS M. DAVIS, OF PHILADELPHIA, PENNSYLVANIA.

IMPROVEMENT IN INCUBATORS.

Specification forming part of Letters Patent No. 193,490, dated July 24, 1877; application filed September 26, 1876.

*To all whom it may concern:*

Be it known that I, THOMAS M. DAVIS, of Philadelphia, Pennsylvania, have invented certain Improvements in Incubators, of which the following is a specification:

My invention relates to improvements in incubators or apparatus for hatching eggs; and the main objects of my invention are to subject the eggs to uniform heat through the medium of a constantly-circulating supply of water, and to afford facilities for the adjustment of the eggs to the heated surface, and for their examination while under treatment.

Figure 1:
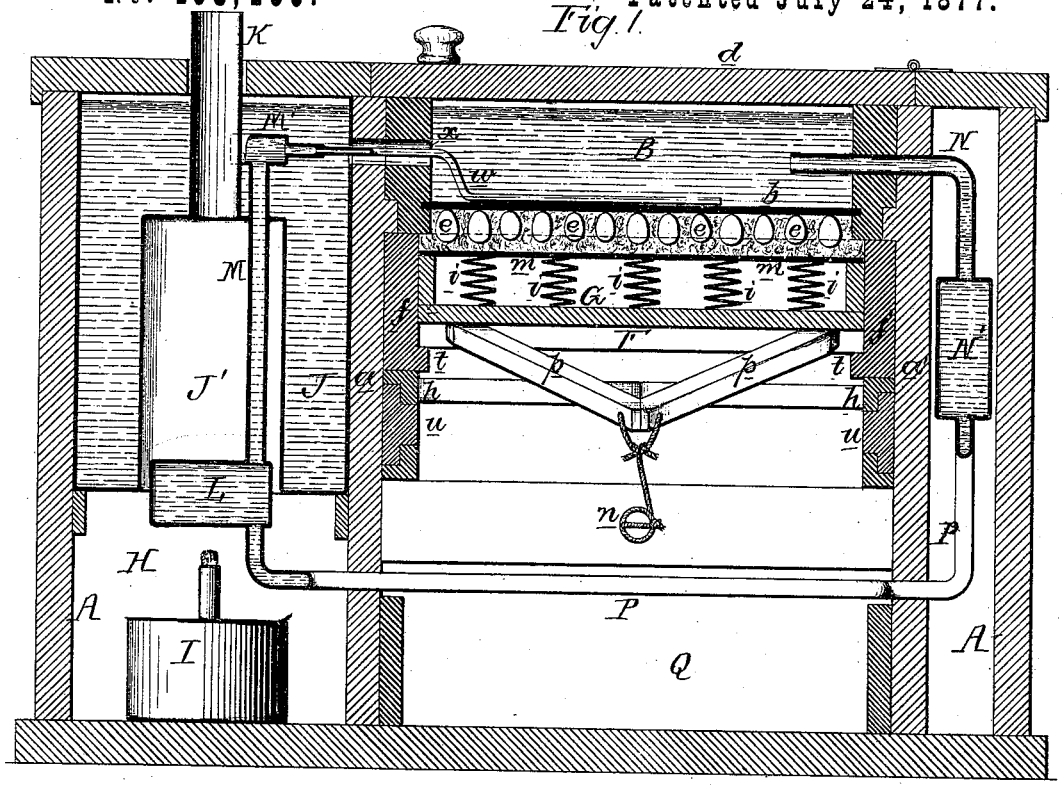
Figure 2:
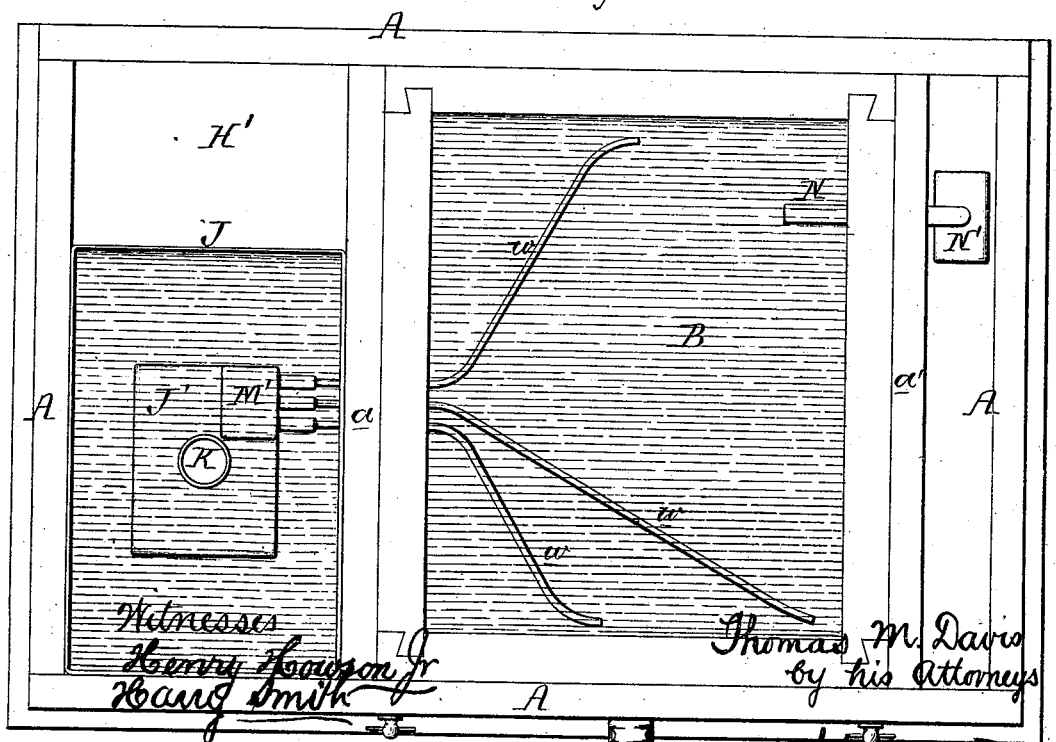

In the accompanying drawings, Figure 1 is a vertical section of my improved incubator; Fig. 2, a plan view, with the cover of the chest removed; and Fig 3 a sectional plan on the line 1 2.

A is a box or chest, preferably made of wood, and separated into the several compartments referred to hereinafter.

Between two partitions, $a\ a'$, extending transversely across the chest, and vertically from the bottom to the top of the same, is a tank, B, containing the water, through the medium of which and the glass bottom $b$ of the tank heat is communicated to the eggs $e$. This tank is so constructed that, after uncoupling the pipes referred to hereinafter, and raising the lid $d$ on the top of the chest, the said tank can be withdrawn vertically from its lodgment between the partition.

Below the tank B there is a drawer, F, the opposite sides $f\ f'$ of which (shown in Fig. 1) are arranged to slide on ways $h\ h$ secured to the two partitions $a\ a'$, and in this drawer a tray, G, is arranged to slide vertically, a series of spiral springs or other elastic mediums resting upon and being secured to the bottom of the tray, and upon the springs a strip, $m$, of flexible fabric—baize for instance—the edges of which are secured to the edges of the tray.

Below the tray is a system of four levers, $p$, which have their fulcrums on cross-bars in the chest, and which are concentrated at one point, where they are connected by a cord or chain to a small windlass, $n$, by operating which the trays can be raised to the elevated position shown in Fig. 1, or may be permitted to fall onto ways $t$ at the lower edge of the drawer F, when the latter, with the drawer, can be pulled outward from the interior of the chest, where it can be supported by sliding ways $u\ u$, adapted to guides on the partitions $a\ a'$.

In the compartment H of the chest is fitted an elevated tank, J, the water in which surrounds a chamber, J', communicating with a chimney, K, the products of combustion of any burning-fluid in a lamp, I, passing first into the chamber, and then off through the chimney. Immediately above the lamp is a chest, L, of such form and so arranged as to partially intercept the products of combustion.

A pipe, M, extends from the chest L to the upper chest M', from which the hot water is distributed through several branches, and pipes $w$ connected therewith, into the tank B, and from the latter extends an outlet-pipe, N, to a reservoir, N', the latter communicating, through a pipe, P, with the above-mentioned chest L.

The several pipes should be furnished with suitable cocks or valves, which it has not been necessary to show in the drawing.

In using the above-described incubator, the first thing to be done is to insure a uniform degree of heat in the tank B and throughout the chest. This is brought about by the lamp I, through the medium of the system of tanks, chests, and pipes above described. The water, heated in the chest L by the direct action of the flame of the lamp, rises through the pipe M, enters the chest M', and is discharged from the latter, through the pipes $w$, into the tank B, the outer ends of these pipes being so situated, and bearing such relation to the outlet-pipe N, that the hot water will be uniformly distributed throughout the tank, the water in which is maintained at the same level with that in the elevated tank J by direct communication between the two at $x$. The water in the tank B flows through the pipe N, and thence into the chest L, the reservoir N' facilitating this flow.

A constant circulation of water is thus maintained through the tank B, which is maintained at a uniform heat, partly by the distribution of hot water into the tank and partly by the maintenance due to the tank J of an unvarying quantity of water in the said tank B. When a uniform heat has been thus established, the incubator is ready to receive the eggs to be hatched.

The drawer F, containing the tray G, is first pulled outward, and its outer end supported on the ways $u\ u$, and a layer of cotton or other equivalent flocculent material is placed on the fabric $m$ of the tray, and the eggs carefully placed in this layer. After this the drawer is pushed into the chest, and the tray, which had previously rested on the ways $t\ t$ of the drawer, is elevated, by means of the windlass $n$ and levers $p$, until the eggs are in contact with the under face of the glass bottom $b$ of the tank B, and here they are caused to remain by any suitable fastening attached to the windlass.

The yielding cushion which supports the eggs insures the proper contact of every egg with the glass.

At intervals of about twenty-four hours the tray should be lowered and the drawer F pulled outward, so that the eggs may be aired for about twenty-five minutes, (the time depending upon the temperature of the air outside the chest,) after which the tray should be restored to its former position.

I have referred to the bottom of the tank as being composed of glass; but it is not absolutely essential that it should be of that material. It may, for instance, be of metal; but I have found, in practice, that glass is the best medium for the retention of heat, and for its uniform distribution to eggs; and it presents the further advantage of permitting the periodical examination of the eggs from above after first opening the lid $d$, and without disturbing the eggs.

At the bottom of the main compartment there is a receptacle or drawer, Q, above which the pipe P is arranged in the form of a coil, P′, so as to maintain within the said receptacle a proper degree of heat for recently-hatched chickens, which are permitted to remain in this receptacle until they are in a proper condition for removal.

Immediately after the eggs are hatched, however, I prefer to dry the chickens by placing them, for a short time, in a compartment, H′, formed near the tank J, after which they may be removed to the receptacle Q.

It will be evident that, although I have shown and described a lamp as the medium for heating the water, a steam-coil or jet, or a stove, may be used in place of the same, if preferred.

I claim as my invention—

1. The combination, in an incubator, of a hot-water tank, B, with an egg-tray provided with suitable yielding material, and with mechanism, substantially as described, for maintaining the contents of the tray in contact with the tank, substantially as described.

2. The combination, in an incubator, of the heated tank B, provided with a glass bottom, with the egg-tray G, as and for the purpose set forth.

3. The combination of the tray G, the springs $i$, the fabric $m$, and the open flocculent material, as and for the purpose described.

4. The combination of the drawer F, tray G, and mechanism, substantially as described, for raising and lowering the tray.

5. The combination of the windlass $n$, the levers $p\ p$, and the tray F, as set forth.

6. The combination of the tank B, the distributing-pipes $w$, and a water-heater with the communicating pipes N P.

7. The combination of the tank B, the water-heater, and the pipes N P with the reservoir N′, as and for the purpose set forth.

8. The combination of the tank B with the heating-chest L, pipe M, chest M′, and its distributing-pipes $w$.

In testimony whereof I have signed my name to this specification in the presence of two subscribing witnesses.

THOMAS M. DAVIS.

Witnesses:
HENRY HOWSON, Jr.,
HARRY SMITH.